Figure 1:
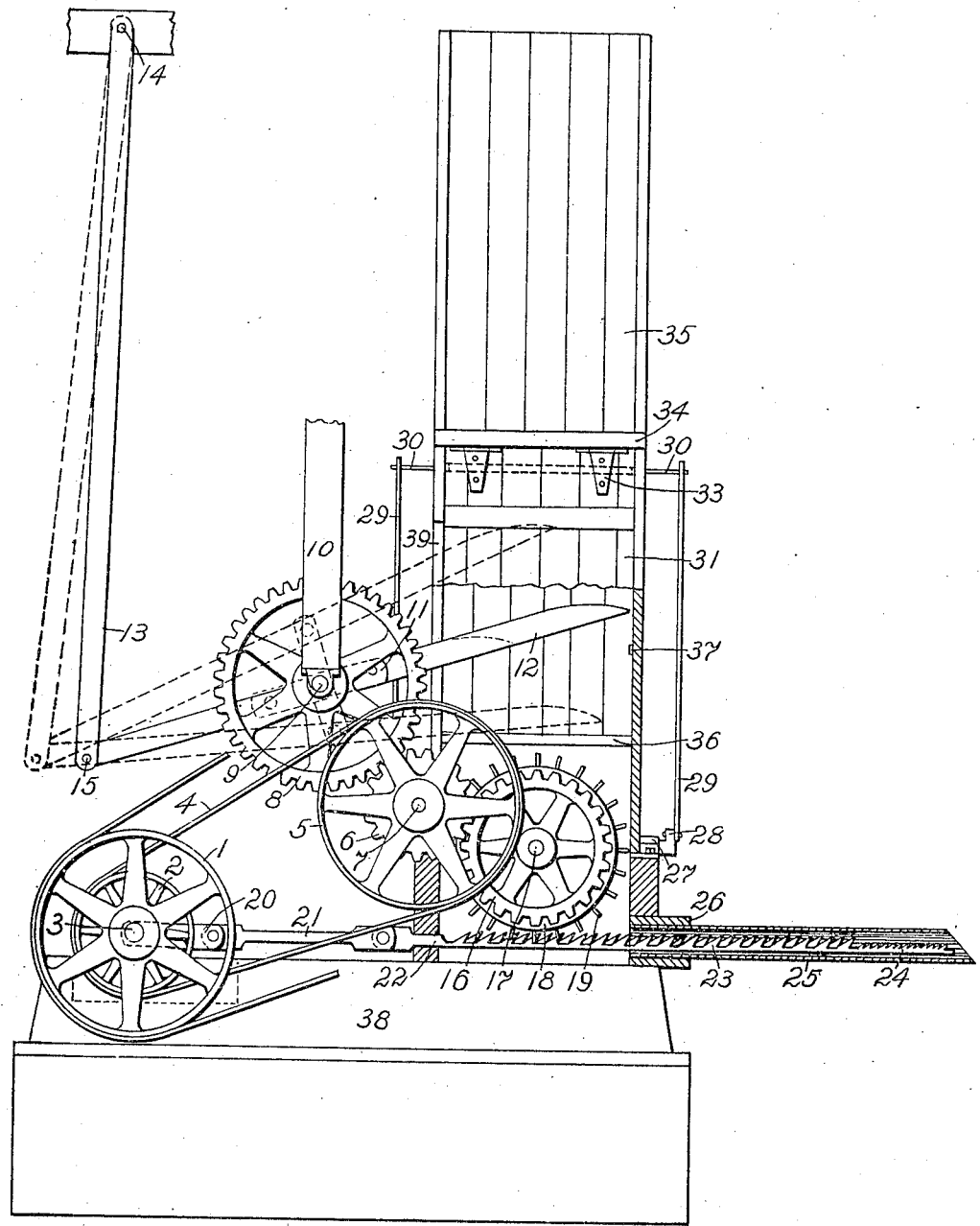

No. 852,137. PATENTED APR. 30, 1907.
L. J. POWERS.
MACHINE FOR STUFFING HORSE COLLARS.
APPLICATION FILED AUG. 30, 1906.

2 SHEETS—SHEET 1.

WITNESSES:

INVENTOR
Leonard J. Powers,

BY
ATTORNEY

No. 852,137. PATENTED APR. 30, 1907.
L. J. POWERS.
MACHINE FOR STUFFING HORSE COLLARS.
APPLICATION FILED AUG. 30, 1906.
2 SHEETS—SHEET 2.
Fig. 2.
Fig. 3.
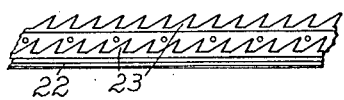
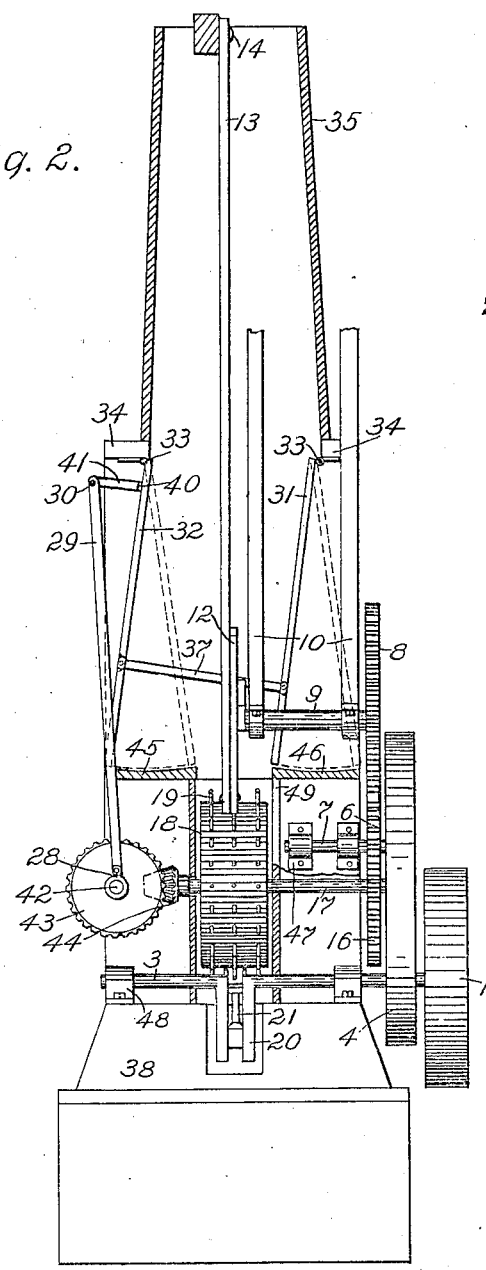
Fig. 4.
WITNESSES:
INVENTOR
Leonard J. Powers,
BY
ATTORNEY

UNITED STATES PATENT OFFICE.

LEONARD J. POWERS, OF WATERLOO, IOWA, ASSIGNOR TO THE POWERS MANUFACTURING COMPANY, OF WATERLOO, IOWA.

MACHINE FOR STUFFING HORSE-COLLARS.

No. 852,137.  Specification of Letters Patent.  Patented April 30, 1907.

Application filed August 30, 1906. Serial No. 332,710.

*To all whom it may concern:*

Be it known that I, LEONARD J. POWERS, a citizen of the United States of America, and a resident of Waterloo, Blackhawk county, Iowa, have invented certain new and useful Improvements in Machines for Stuffing Horse-Collars, of which the following is a specification.

My invention relates to improvements in machines for stuffing horse collars, and the objects of my improvements are to improve the mechanism and mode of operation of the machine patented by Otis Jones, No. 670,051 on March 19, 1901, by providing an auxiliary double acting mechanism for assisting in feeding the material from the hopper to the toothed drum, and in effecting an interacting combination of the toothed drum and the toothed stuffing rod. This application is differentiated in the above particulars from the new features of invention set forth in another application executed and filed by me on this date on a machine for stuffing horse collars. These objects I have accomplished by the mechanism which is hereinafter described and claimed, and which is illustrated in the drawings hereto annexed, in which—

Figure 1 is a side elevation of my invention, parts being sectioned away to more fully disclose the mechanism thereof; Fig. 2 is a rear elevation of the same; Fig. 3 is an enlarged detail view of a portion of the tooth bearing stuffing rod, and Fig. 4 is an enlarged detail front elevation of the toothed drum.

Similar numbers refer to similar parts throughout the several views.

35 is a hopper containing two compartments one above another, separated by the shelves 45, 46, which, however, have a space between them to allow communication between the compartments. The lower compartment has sides 49 within which a drum 18 is mounted on a horizontal shaft 17 whose ends project through said sides 49, one end bearing a bevel pinion 44 and the other carrying a spur-gear-wheel 16. The surface of said drum 18 has three parallel circumferential rows of projecting radial teeth 19, said rows being equidistantly spaced apart. The gear wheel 16 is driven by means of a pinion fixed on a short shaft 7 in bearings 47, a belt-wheel 5 on said shaft also being driven by a belt-wheel 2 fixed on the shaft 3, the latter also being driven by a drive-wheel 1.

22 is a stuffing rod arranged to be reciprocated horizontally within a stuffing tube 25, and which is actuated by means of a connecting rod 21 pivoted to a crank 20 on a shaft 3. The shaft 3 is rotatably mounted in bearings 48 affixed to an engine bed 38. As shown in Fig. 4, the teeth 19 of the drum 18 are set on the circumferential periphery thereof in three parallel rows so spaced apart as to permit of the teeth 23 of the stuffing-rod 22 moving between them but not in contact therewith. The anterior portion of the stuffing-rod 22 has a row of smaller forwardly bent teeth 24 to assist in the delivery of the material through the delivery opening of said tube.

In the upper compartment of the hopper 35 are placed cross-bars 34 to which are hinged at 33 the depending swinging sides 31 and 32. The shelves 45 and 46 have their upper surfaces so curved as to conform to the line of swinging motion of the lower edges of the sides 31 and 32, so as to prevent the latter from sweeping material out from the hopper. The sides 31 and 32 are connected together in front by a pivoted link 37, which causes them to move synchronously together. The arc of swinging movement of these sides is limited to end at the inner edges of the shelves 45 and 46 so as to push the material in the hopper continuously toward the opening between the shelves. From a cleat 40 affixed to the upper portion of the outer side of the swinging side 42 extend bracket arms 41 from which pins project to front and rear. A shaft 42 is mounted in bearings 27 and has at each end short cranks 28. Links 29 connect the cranks 28 to the pins 30. Mounted on the shaft 42 is a bevel gear wheel 43 intermeshing with the bevel pinion 44. A vertical slot 39 is placed in the center portion of the rear side of the upper compartment of the hopper 35 for the reception therethrough of the free forward end of a packing lever 12, the latter being medially pivoted to a crank 11 on the end of a short shaft 9 mounted in bearings at the lower ends of the hangers 10. The rear end of the packing lever 12 is pivotally fulcrumed to the lower end of a swing-hanger 13 depending from an overhead pivot 14. The crank 11 and shaft 9 are rotated by means of a gear wheel 8 mounted on said shaft and intermeshing with the pinion 6 on the shaft 7.

The operation of my improved machine is as follows. When the hopper 35 has been filled with the material for stuffing a horse collar, and the drive wheel 1 has been set in rotation by means of any suitable source of power, simultaneously, by means of the mechanism already described, the stuffing rod 22 is caused to reciprocate horizontally, the toothed drum 18 to rotate forwardly, and the packing lever 12 to move its free forward end from above forwardly and downward and then backwardly as indicated by the dotted lines in Fig. 1. At the same time the sides 31 and 32, by means of the bevel gearing 44, 43, and the links 29 have been set to swinging synchronously pendulum-wise. The material in the hopper 35 is by the swinging action of the sides 31, 32, pushed to the opening between the shelves 46, 45, through which opening the material is thrust by the downward action of the packing lever 12 upon the teeth of the forwardly rotating drum 18. The material is thence carried forwardly by the drum to the reciprocating stuffing rod 22 whose teeth 23 seize it, strip it off said drum and carry it forward through the tube 25 whence it is delivered and packed into the collar or sack to be filled.

Having described my invention, what I claim as new, and desire to secure by Letters Patent, is—

1. In a machine for stuffing collars, the combination with a hopper having swinging sides, of means for distributing the material in the hopper, a tube connected with the hopper, and a toothed rod reciprocating through the hopper and tube.

2. In a machine for stuffing collars, the combination with a hopper having linked swinging sides, of a distributing drum rotatably mounted in said hopper, a tube in communication with said hopper and a toothed rod reciprocating through said hopper and tube.

3. In a machine for stuffing collars, the combination with a slotted hopper having inwardly movable sides, of a packing rod adapted to reciprocate through the slot in said hopper to press down the material therein, means for distributing said material in said hopper, a tube in communication with said hopper, and means for conveying said distributed material through said tube.

4. In a machine for stuffing collars, the combination with a slotted hopper having inwardly movable sides arranged to synchronously move together in the same direction, of a drum rotatably mounted in said hopper, distributing pins on said drum, a tube in communication with said hopper and means for conveying the distributed material through said tube.

5. In a machine for stuffing collars, the combination with a hopper having inwardly movable sides, of a drum rotatably mounted therein, circumferential rows of distributing pins on said drum spaced apart, a tube, a toothed rod reciprocating through said hopper and tube whose teeth are arranged to move between the rows of pins on said drum to gather the material carried thereon.

6. In a machine for stuffing collars, the combination with a hopper having inwardly movable sides, of a drum rotatably mounted therein, circumferential rows of distributing pins on said drum spaced apart, means for packing the material down upon said drum, a tube, and a toothed rod reciprocating through said hopper and tube whose teeth are arranged to move between the rows of pins on said drum to gather the material carried thereon.

Signed at Waterloo, Iowa, this 11th day of Aug. 1906.

LEONARD J. POWERS.

Witnesses:
BERTHA COLLENTINE,
M. E. KENNEDY